United States Patent
Levy et al.

(10) Patent No.: US 10,778,568 B2
(45) Date of Patent: Sep. 15, 2020

(54) SWITCH-ENHANCED SHORT LOOP CONGESTION NOTIFICATION FOR TCP

(71) Applicant: Mellanox Technologies, Ltd., Yokneam (IL)

(72) Inventors: Gil Levy, Hod Hasharon (IL); Alex Shpiner, Nesher (IL); Benny Koren, Zichron Yaakov (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 15/831,414

(22) Filed: Dec. 5, 2017

(65) Prior Publication Data
US 2019/0173776 A1 Jun. 6, 2019

(51) Int. Cl.
H04L 12/707 (2013.01)
H04L 12/833 (2013.01)
H04L 12/801 (2013.01)
H04L 12/803 (2013.01)

(52) U.S. Cl.
CPC ............ H04L 45/22 (2013.01); H04L 47/11 (2013.01); H04L 47/122 (2013.01); H04L 47/31 (2013.01)

(58) Field of Classification Search
CPC ... H04L 47/10-12; H04L 47/11; H04L 47/12; H04L 43/16; H04L 47/125; H04L 43/0882; H04L 47/30; H04L 43/0888; H04L 47/2441
See application file for complete search history.

(56) References Cited

U.S. PATENT DOCUMENTS

| | | | | |
|---|---|---|---|---|
| 2012/0147750 A1* | 6/2012 | Pelletier | ............... | H04L 47/12 370/235 |
| 2012/0307634 A1* | 12/2012 | Zhu | .............. | H04W 28/02 370/231 |
| 2014/0126363 A1* | 5/2014 | Zeng | ............... | H04W 28/0205 370/230 |
| 2016/0164792 A1* | 6/2016 | Oran | ............... | H04L 47/283 370/236 |
| 2016/0261510 A1* | 9/2016 | Burnette | ............ | H04L 43/0882 |
| 2016/0344631 A1* | 11/2016 | Krishnamurthy | ..... | H04L 47/115 |
| 2017/0118108 A1* | 4/2017 | Avci | .............. | H04L 47/12 |
| 2017/0187593 A1* | 6/2017 | Balasubramanian | ............ | H04L 67/2804 |

(Continued)

OTHER PUBLICATIONS

Ramakrishnan et al., "The Addition of Explicit Congestion Notification (ECN) to IP", RFC 3168, 63 pages, Sep. 2001.

(Continued)

*Primary Examiner* — Asad M Nawaz
*Assistant Examiner* — Najeeb Ansari
(74) *Attorney, Agent, or Firm* — Kligler & Associates Patent Attorneys Ltd

(57) ABSTRACT

A network element includes multiple ports and packet processing circuitry. The ports are configured for exchanging packets with a communication network. The packet processing circuitry is configured to forward first packets over a forward path from a source node to a destination node, to forward second packets over a reverse path, which is opposite in direction to the forward path, from the destination node to the source node, and to mark one or more of the second packets that are forwarded over the reverse path, with an indication that notifies the source node that congestion is present on the forward path.

13 Claims, 2 Drawing Sheets

(56) References Cited

U.S. PATENT DOCUMENTS

| | | | |
|---|---|---|---|
| 2018/0048567 A1* | 2/2018 | Ignatchenko | H04L 45/3065 |
| 2018/0077064 A1* | 3/2018 | Wang | H04L 47/125 |
| 2018/0150313 A1* | 5/2018 | Iwakura | G06F 9/45558 |
| 2018/0183615 A1* | 6/2018 | Stephan | H04L 69/14 |
| 2018/0375801 A1* | 12/2018 | Cheng | H04L 49/50 |
| 2020/0014486 A1* | 1/2020 | Harrang | H04L 1/0038 |

OTHER PUBLICATIONS

IEEE P802.1Qau/D2.4—"Draft Standard for Local and Metropolitan Area Networks—Virtual Bridged Local Area Networks—Amendment: Congestion Notification", 119 pages, Oct. 28, 2009.

\* cited by examiner

SWITCH-ENHANCED SHORT LOOP CONGESTION NOTIFICATION FOR TCP

FIELD OF THE INVENTION

The present invention relates generally to data communication networks, and particularly to methods and systems for congestion control.

BACKGROUND OF THE INVENTION

Traffic traversing communication networks is sometimes subject to network congestion. Various techniques for detecting and controlling congestion are known in the art.

For example, Ramakrishnan et al. describe congestion control techniques that use Explicit Congestion Notification (ECN), in Request for Comments (RFC) 3168 of the Internet Engineering Task Force (IETF), entitled "The Addition of Explicit Congestion Notification (ECN) to IP," September, 2001, which is incorporated herein by reference.

Another congestion notification scheme, referred to as Quantized Congestion Notification (QCN), is specified in "IEEE P802.1Qau/D2.4—Draft Standard for Local and Metropolitan Area Networks—Virtual Bridged Local Area Networks—Amendment: Congestion Notification," Oct. 28, 2009, which is incorporated herein by reference. In the QCN scheme, bridges detect the congestion state of specified output queues, and send congestion notification messages to the sources of a sampling of the frames in the queue.

SUMMARY OF THE INVENTION

An embodiment of the present invention that is described herein provides a network element including multiple ports and packet processing circuitry. The ports are configured for exchanging packets with a communication network. The packet processing circuitry is configured to forward first packets over a forward path from a source node to a destination node, to forward second packets over a reverse path, which is opposite in direction to the forward path, from the destination node to the source node, and to mark one or more of the second packets that are forwarded over the reverse path, with an indication that notifies the source node that congestion is present on the forward path.

In an embodiment, the packet processing circuitry is configured to identify, from among multiple ports of the network element, a port in which the congestion on the forward path occurs, and to mark one or more of the second packets entering the network element at the identified port.

In another embodiment, the packet processing circuitry is configured to select a second packet forwarded over the reverse path, to identify, from among multiple ports of the network element, a port that serves as an egress port for the first packets on the forward path whose destination address is equal to a source address of the second packet, to check whether the congestion occurs at the identified port, and, upon ascertaining that the congestion occurs at the identified port, to mark the selected second packet.

In yet another embodiment, the packet processing circuitry is configured to select a second packet forwarded over the reverse path, to identify, from among multiple egress queues of the network element, an egress queue used for queuing the first packets on the forward path whose destination address is equal to a source address of the second packet, to check whether the congestion occurs at the identified egress queue, and, upon ascertaining that the congestion occurs at the identified egress queue, to mark the selected second packet.

In some embodiments, in addition to marking one or more of the second packets, the packet processing circuitry is configured to also mark one or more of the first packets that are subject to the congestion on the forward path. In some embodiments, the packet processing circuitry is configured to mark at least one second packet, which was transmitted from the destination node before the congestion was detected by the network element.

There is additionally provided, in accordance with an embodiment of the present invention, a method including, in a network element, forwarding first packets over a forward path from a source node to a destination node, and forwarding second packets over a reverse path, which is opposite in direction to the forward path, from the destination node to the source node. One or more of the second packets that are forwarded over the reverse path are marked, by the network element, with an indication that notifies the source node that congestion is present on the forward path.

There is further provided, in accordance with an embodiment of the present invention, a computer software product, the product including a tangible non-transitory computer-readable medium in which program instructions are stored, which instructions, when read by a processor in a network element, cause the processor to forward first packets over a forward path from a source node to a destination node, to forward second packets over a reverse path, which is opposite in direction to the forward path, from the destination node to the source node, and to mark one or more of the second packets that are forwarded over the reverse path, with an indication that notifies the source node that congestion is present on the forward path.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for congestion control in packet communication networks. In some embodiments, two compute nodes, referred to as a source node and a destination node, communicate with one another over a bidirectional connection, e.g., a Transmission Control Protocol (TCP) connection.

The path from the source node to the destination node is referred to as a forward path, and the packets traversing this path are referred to as forward packets. The path in the opposite direction, from the destination node to the source node, is referred to as a reverse path, and the packets traversing this path are referred to as reverse packets.

In some embodiments, a network switch, which forwards both the forward packets and the reverse packets, detects congestion on the forward path. The switch intercepts one or more of the reverse packets that are in-flight from the destination node to the source node, and marks them with a mark (e.g., an "ECN Echo" (ECE) flag) that notifies the source node of the congestion. Upon receiving the marked reverse packets, the source node may take action to resolve the congestion, e.g., reduce the transmission rate of the forward packets. In addition to marking reverse packets, the switch may also mark one or more of the forward packets, e.g., in accordance with the RFC 3168 ECN mechanism.

When using the disclosed technique, the overall latency of the congestion notification mechanism does not depend on the entire round-trip delay between the source node and the destination node, but only on the round-trip delay between the source node and the network switch that detects the congestion. As such, the disclosed technique enables the source node to react rapidly and minimize packet drop and other performance degradation.

Moreover, the disclosed technique exploits reverse packets that are sent anyhow from the destination node to the source node, and does not require generation of any new packet for the sake of congestion notification. As such, the disclosed technique does not incur any additional traffic overhead.

Several example implementations of the disclosed technique are described in detail below. Some implementations are simple to implement, but assume that the reverse packets enter the switch at the same port via which the forward packets exit the switch. Other implementations, which are slightly more complex, do not make this assumption and can be used in scenarios that do not have such port symmetry.

System Description

Figure 1:
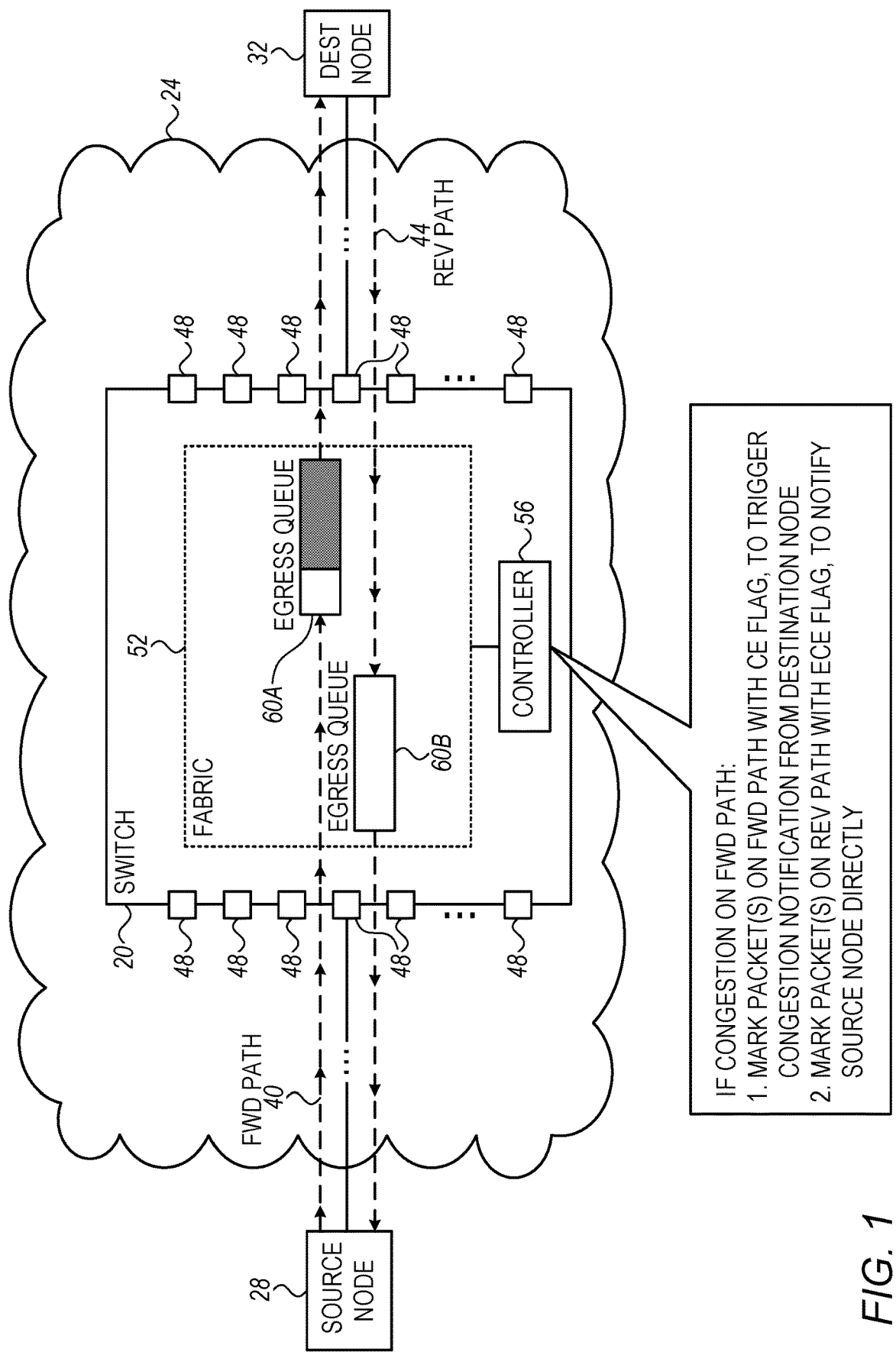
FIG. 1 is a block diagram that schematically illustrates a network switch employing fast congestion notification, in accordance with an embodiment of the present invention.

FIG. 1 is a block diagram that schematically illustrates a network switch 20 employing fast congestion notification, in accordance with an embodiment of the present invention. In example of FIG. 1, switch 20 is part of an Internet Protocol (IP) packet network 24. Two compute nodes, referred to as a source node 28 and a destination node 32, communicate with one another by sending packets over network 24. As part of the route through network 24, the packets pass via switch 20.

In the present example, nodes 28 and 32 belong to a Transmission Control Protocol (TCP) flow having a forward path 40 and a reverse path 44. TCP is by definition a bidirectional protocol, and therefore, even if actual data is transmitted only over the forward path, acknowledgements will be transmitted over the reverse path. The packets traversing forward path 40 (packets originating from source node 28 and destined to destination node 32) are referred to as "forward packets." The packets traversing reverse path 44 (packets originating from destination node 32 and destined to source node 28) are referred to as "reverse packets."

In the example of FIG. 1, switch 20 comprises multiple ports 48, a switch fabric 52 and a controller 56. Ports 48 serve as network interfaces for transmitting and receiving packets to and from network 24. Switch fabric 52 is configured to forward packets between the ports as appropriate.

Among other elements, fabric 52 comprises an egress queue 60A for queuing the packets traversing forward path 40 before they exit the switch, and an egress queue 60B for queuing the packets traversing reverse path 44 before they exit the switch. In an embodiment, queue 60A is associated with the port 48 via which the forward packets exit switch 20 (the egress port of the forward packets), and queue 60B is associated with the port 48 via which the reverse packets exit the switch (the egress port of the reverse packets).

Controller 56 controls switch 20 in general, and among other functions configures and controls fabric 52. In some embodiments of the present invention, controller 56 also detects congestion and generates congestion notifications, using methods that are described in detail below.

The network and switch configurations of FIG. 1 are exemplary configurations that are shown purely for the sake of conceptual clarity. Any other suitable network and/or switch configuration can be used in alternative embodiments.

For example, FIG. 1 shows only two nodes and a single switch, for the sake of clarity. In practice, network 24 often serves a large number of nodes, and comprises multiple network switches and/or other network elements. Forward path 40 and reverse path 44 may traverse additional switches and network links, not shown in the figure. Nodes 28 and 32 may comprise any suitable type of compute nodes or computers.

As yet another example, although the embodiments described herein refer mainly to network switches, the disclosed techniques can be used in various other types of network elements that process packets, e.g., routers, bridges, gateways and network processors.

Moreover, the embodiments described herein refer to a particular task partitioning ("division of labor") between fabric 52 and controller 56, by way of example. In alternative embodiments, any other task partitioning can be used. Fabric 52 and controller 56 are referred to herein collectively as "packet processing circuitry" that carries out the disclosed techniques. In alternative embodiments, the packet processing circuitry may be implemented in any other suitable manner and may comprise any other suitable elements. Elements that are not necessary for understanding the principles of the disclosed techniques have been omitted from the figure for clarity.

The different elements of switch 20, such as fabric 52 and controller 56, may be implemented using suitable hardware, such as in an Application-Specific Integrated Circuit (ASIC) or Field-Programmable Gate Array (FPGA), using software, or using a combination of hardware and software elements. In an example embodiment, although not necessarily, fabric 52 is implemented in hardware whereas the functions of controller 56 are implemented in software.

In some embodiments, controller 56 comprises a general-purpose programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Generating Fast and Low-Overhead Congestion Notifications in Network Switch

In some embodiments of the present invention, controller 56 detects congestion conditions on forward path 40, and notifies source node 28 of the detected congestion.

Unlike the ECN-based techniques of RFC 3168 (in which the switch sends a notification to the destination node and the destination node responds with a notification to the source node), in the disclosed technique the switch sends the notification directly on reverse path 44 en-route to source node 28. As a result, the source node is able to react quickly to the detected congestion.

Moreover, unlike schemes such as QCN, in the disclosed technique there is no need to generate a new packet to carry the notification. Instead, switch 20 intercepts one or more packets that traverse reverse path 44, e.g., TCP acknowledgement (TCP ACK) packets sent from destination node 32 to source node 28, and marks these packets with a congestion flag. As a result, no traffic overhead is incurred by the congestion notification mechanism.

Controller 56 may use any suitable technique for detecting that the packets on forward path 40 are subject to congestion. In an example embodiment, controller 56 identifies congestion by detecting that egress queue 60A (which queues the forward packets) if about to become full, e.g., that the fill level of queue 60A exceeds a certain predefined threshold.

In some embodiments, controller 56 notifies source node 28 of the detected congestion (experienced by the forward packets) using two separate mechanisms:

"Long loop": Controller 56 selects one or more of the forward packets that are subject to the congestion, and sets the "Congestion Experienced" (CE) flag in the packet header of the selected packet(s) to indicate the congestion. When a forward packet whose CE flag is set reaches destination node 32, the destination node is configured to generate a reverse packet in which the "ECN Echo" (ECE) flag is set. This reverse packet traverses the entire reverse path 44 until reaching source node 28, which in turn detects the CE flag and reacts to the congestion notification. This mechanism is in accordance with RFC 3168, cited above.

"Short-loop": Controller 56 selects one or more of the reverse packets that were sent from destination node 32 to source node 28 along reverse path 44. Upon selecting a reverse packet, e.g., a TCP ACK packet, controller 56 sets the ECE flag of this packet to indicate the congestion. The marked reverse packet continues its journey along the reverse path until reaching source node 28. The source node detects the CE flag and reacts to the congestion notification.

As can be seen from the description above, the latency of the disclosed "short-loop" mechanism does not depend on the entire round-trip delay between source node 28 and destination node 32, but only on the round-trip delay between source node 28 and switch 20. As such, the "short-loop" mechanism is considerably faster than the "long-loop" mechanism of RFC 3168.

In fact, when using the "short-loop" mechanism, a reverse packet that switch 20 marks with the ECE flag may have been transmitted from destination node 32 even before switch 20 detected the congestion. At the time the switch detects the congestion, this packet may already be "in-flight" along the reverse path between destination node 32 and switch 20.

Note also that the disclosed "short-loop" mechanism uses reverse packets that are sent anyhow from node 32 to node 28, and does not require generation of any new packet for the sake of congestion notification.

In the embodiment described above, controller 56 implements both the "long-loop" and "short-loop" mechanisms (i.e., marks forward packets with CE and reverse packets with ECE). In alternative embodiments, controller 56 implements the "short-loop" mechanism and not the "long-loop" mechanism (i.e., only marks reverse packets with ECE). In either case, source node 28 is notified of the congestion by receiving one or more reverse packets whose ECE flag is set. The source node is typically unable to (and has no need to) distinguish whether the ECE flag was set by destination node 32 (as part of the "long-loop" mechanism) or by switch 20 (as part of the "short-loop" mechanism).

In various embodiments, source node 28 may react to the congestion notification in any suitable way. For example, the source node may reduce the bandwidth of transmission on forward path 40, e.g., by reducing the transmission rate of forward packets. As another example, the source node may reroute the flow of packets (or request rerouting) to a different path that may not be congested.

In various embodiments, controller 56 may select for possible congestion notification a single reverse packet, all the reverse packets, or any suitable subset of the reverse packets, based on any suitable criterion.

In some example embodiments, for a certain port 48 that is congested on the forward path, controller 56 selects and marks all reverse-path TCP packets that enter switch 20 via that port. This embodiment assumes that the reverse path enters the switch at the same port via which the forward path exits the switch (i.e., that the same port serves as the ingress port for the reverse path and as the egress port for the forward path). This symmetry assumption holds in many practical cases, e.g., when the congested switch is the last switch on the forward path. In popular network topologies such as clos, the symmetry assumption holds in several cases, e.g., when the congestion occurs in the upstream direction at the Top-Of-Rack (TOR) switch, and when applying symmetric hashing in the switch (selecting egress port by applying the same hash function in the forward and reverse paths of a flow, or applying the same hash function in all switches of the same clos hierarchy, e.g., by using the same switch vendor and configuring the same hash seed).

In other embodiments, controller 56 may select and mark reverse packets based on source/destination addresses rather than based on port number. For example, upon receiving a reverse packet having {source IP address=X}, controller 56 may check whether the output port used for forward packets having {destination IP address=X} is congested. More specifically, if the port in question has several egress queues, the controller may check whether the specific egress queue associated with {destination IP address=X} is congested. If the port (or possibly the specific egress queue) is congested, the controller may mark the reverse packet with ECE. In some embodiments, controller 56 may perform this process for only a small subset (i.e., a sample) of the reverse packets, since performing the process for all reverse-path packets may be prohibitive in terms of switch resources.

In the latter embodiments (address-dependent), the reverse packets need not necessarily enter the switch at the same port via which the forward path exits the switch. Such address-dependent embodiments are more complex to implement and require more switch resources, but do not rely on egress/ingress port symmetry as the port-dependent embodiments.

Figure 2:
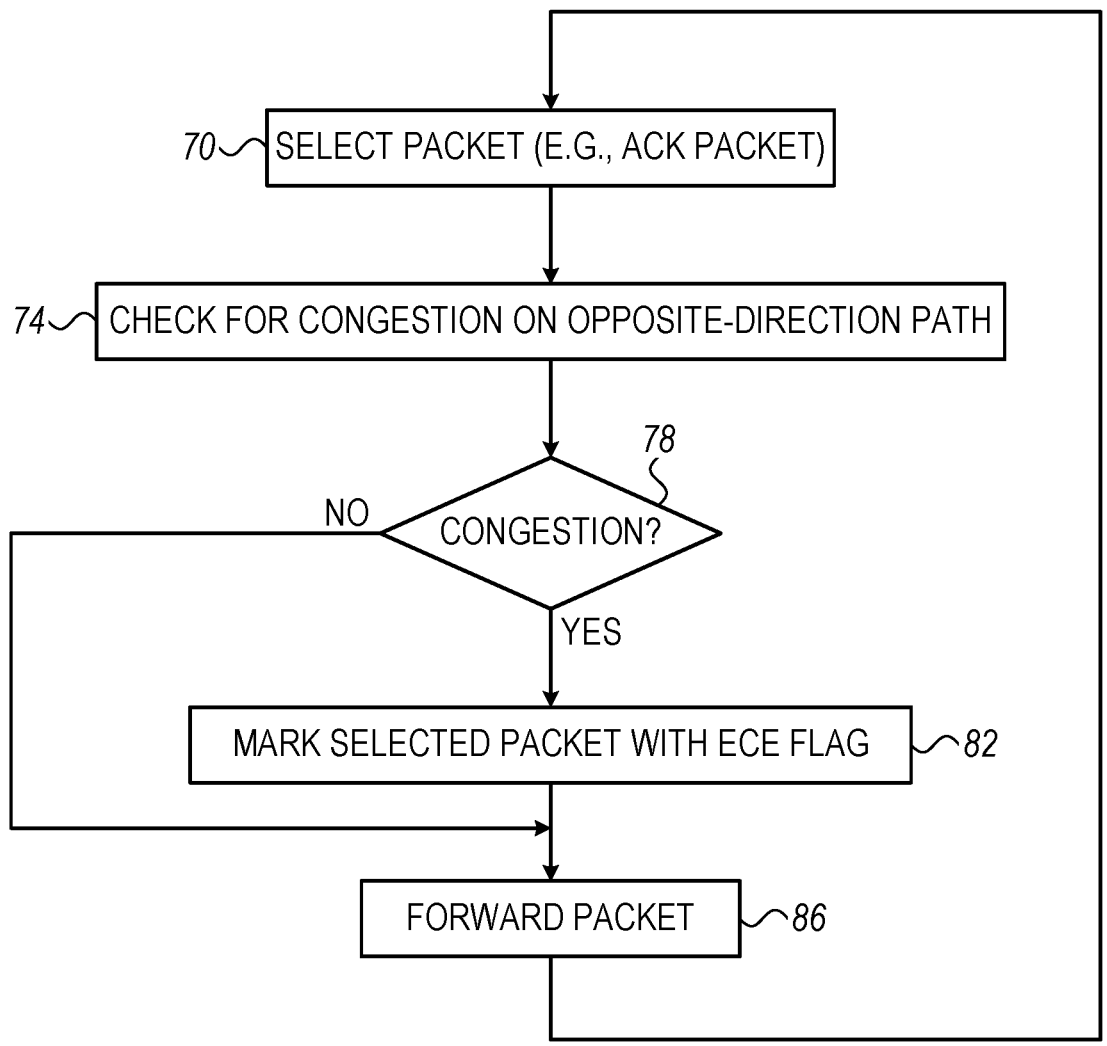
FIG. 2 is a flow chart that schematically illustrates a method for congestion notification, in accordance with an embodiment of the present invention.

FIG. 2 is a flow chart that schematically illustrates a method for congestion notification, carried out in switch 20, in accordance with an embodiment of the present invention. The flow chart focuses on the disclosed "short-loop" mechanism, regardless of whether or not the "long-loop" mechanism is applied in parallel.

The method begins with controller 56 selecting a packet on reverse path 44 that is suitable for marking with ECE (e.g., a TCP ACK packet), at a packet selection step 70. Upon selection of such a packet, controller 56 checks for congestion on the opposite-direction path (on forward path 40), at a congestion checking step 74.

As noted above, in some embodiments controller 56 may check for forward-path congestion on the port via which the reverse packet entered the switch. In other embodiments, controller 56 may reverse the source/destination IP addresses of the reverse packet, and then perform look-up on the destination IP address and check for congestion on the resulting port number (and possibly a specific egress queue within the port). (In other words, if the reverse packet has {source IP address=X}, the controller may look-up the port number (and possibly a specific egress queue) via which forward-path packets having {destination IP address=X} are to exit the switch, and check for forward-path congestion on that port (possibly on a specific egress queue within the port).}

If congestion is detected, at a congestion detection step 78, controller 56 sets the ECE flag of the selected reverse packet, at a marking step 82. Fabric 52 then forwards the marked packet to the appropriate port leading to source node 28, at a forwarding step 86. If no congestion is detected at step 78, controller 56 does not mark the reverse packet (i.e., skips step 82). Fabric 52 then forwards the packet at step 86.

In the example of FIG. 2, the "short-loop" process is triggered by reception of a suitable reverse packet (e.g., TCP ACK) in switch 20. In this embodiment, controller 56 detects that a suitable reverse packet was received at switch 20 over reverse path 44, and in response checks for congestion on forward path 40. If congestion is detected, the controller marks the reverse packet with ECE. Alternatively, controller 56 may initiate the "short-loop" notification process in response to any other suitable event.

Although the embodiments described herein mainly address TCP flows transported over IP networks, the methods and systems described herein can also be used in other applications, such as in Infiniband networks. Some Infiniband networks support congestion notifications called Backward ECN (BECN), which are sent from the destination node to the source node. The disclosed technique can be implemented in such a network, for example, by an Infiniband switch intercepting ACK packets and marking them with BECN.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network element, comprising:
multiple ports for exchanging packets with a communication network; and
packet processing circuitry, configured to:
receive via the ports packets from the communication network, and transmit the received packets to the network via the ports, the packets associated with flows each having a respective forward path from a respective source node to a respective destination node, and a respective reverse path, which is opposite in direction to the forward path, from the destination node to the source node;
select a flow in which congestion is to be checked on the forward path, by intercepting on the reverse path of the flow a second packet that was sent from the destination node to the source node and is suitable for marking with a congestion indication; and
after selecting the flow by intercepting the second packet on the reverse path of the flow, check whether congestion is present on the forward path of the flow, and, if congestion is found on the forward path, mark the intercepted second packet with the congestion indication that notifies the source node of the congestion present on the forward path,
wherein the packet that is suitable for marking with a congestion indication comprises a TCP acknowledgement packet, and
wherein the congestion indication is an Explicit Congestion Notification Echo flag.

2. The network element according to claim 1, wherein the packet processing circuitry is configured to:
identify, from among multiple ports of the network element, a port that serves as an egress port for the first packets on the forward path whose destination address is equal to a source address of the second packet;
check whether the congestion occurs at the identified port; and
upon ascertaining that the congestion occurs at the identified port, mark the second packet.

3. The network element according to claim 1, wherein the packet processing circuitry is configured to:
identify, from among multiple egress queues of the network element, an egress queue used for queuing the first packets on the forward path whose destination address is equal to a source address of the second packet;
check whether the congestion occurs at the identified egress queue; and
upon ascertaining that the congestion occurs at the identified egress queue, mark the second packet.

4. The network element according to claim 1, wherein, in addition to marking the second packet, the packet processing circuitry is configured to also mark one or more of the first packets that are subject to the congestion on the forward path.

5. The network element according to claim 1, wherein the second packet was transmitted from the destination node before the congestion was detected by the network element.

6. The network element according to claim 1, wherein the packet processing circuitry is configured to mark the second packet with a congestion notification that is indistinguishable, to the source node, from congestion notifications sent by the destination node.

7. A method, comprising:
in a network element having multiple ports, receiving via the ports packets from a communication network, and transmitting the received packets to the network via the ports, the packets associated with flows each having a respective forward path from a respective source node to a respective destination node, and a respective reverse path, which is opposite in direction to the forward path, from the destination node to the source node;
selecting a flow in which congestion is to be checked on the forward path, by intercepting in the network element, on the reverse path of the flow, a second packet that was sent from the destination node to the source node and is suitable for marking with a congestion indication; and after selecting the flow by intercepting the second packet on the reverse path of the flow, checking whether congestion is present on the forward path of the flow, and, if congestion is found on the forward path, marking, by the network element, the second packet with the congestion indication that notifies the source node of the congestion present on the forward path, wherein the packet that is suitable for marking with a congestion indication comprises a TCP acknowledgement packet, and wherein the congestion indication is an Explicit Congestion Notification Echo flag.

8. The method according to claim 7, wherein marking the second packet comprises:

identifying, from among multiple ports of the network element, a port that serves as an egress port for the first packets on the forward path whose destination address is equal to a source address of the second packet;

checking whether the congestion occurs at the identified port; and upon ascertaining that the congestion occurs at the identified port, marking the second packet.

9. The method according to claim 7, wherein marking the second packets comprises:

identifying, from among multiple egress queues of the network element, an egress queue used for queuing the first packets on the forward path whose destination address is equal to a source address of the second packet;

checking whether the congestion occurs at the identified egress queue; and upon ascertaining that the congestion occurs at the identified egress queue, marking the second packet.

10. The method according to claim 7, and comprising, in addition to marking the second packet, also marking one or more of the first packets that are subject to the congestion on the forward path.

11. The method according to claim 7, wherein the second packet was transmitted from the destination node before the congestion was detected by the network element.

12. The method according to claim 7, wherein marking the second packet comprises marking the second packet with a congestion notification that is indistinguishable, to the source node, from congestion notifications sent by the destination node.

13. A computer software product, the product comprising a tangible non-transitory computer-readable medium in which program instructions are stored, which instructions, when read by a processor in a network element having multiple ports, cause the processor to:

receive via the ports packets from the communication network, and transmit the received packets to the network via the ports, the packets associated with flows each having a respective forward path from a respective source node to a respective destination node, and a respective reverse path, which is opposite in direction to the forward path, from the destination node to the source node;

select a flow in which congestion is to be checked on the forward path, by intercepting on the reverse path of the flow a second packet that was sent from the destination node to the source node and is suitable for marking with a congestion indication; and after selecting the flow by intercepting the second packet on the reverse path of the flow, check whether congestion is present on the forward path of the flow, and, if congestion is found on the forward path, mark the intercepted second packet with the congestion indication that notifies the source node of the congestion present on the forward path wherein the packet that is suitable for marking with a congestion indication comprises a TCP acknowledgement packet, and wherein the congestion indication is an Explicit Congestion Notification Echo flag.

\* \* \* \* \*